March 1, 1960

J. F. COMBEST 2,926,787

FILTER MAGNET

Filed March 31, 1958

INVENTOR.
JOHN F. COMBEST
BY
Bertram H. Mann
ATTORNEY

March 1, 1960

J. F. COMBEST 2,926,787

FILTER MAGNET

Filed March 31, 1958

INVENTOR.
JOHN F. COMBEST
BY Bertram H. Mann
ATTORNEY

United States Patent Office 2,926,787
Patented Mar. 1, 1960

2,926,787

FILTER MAGNET

John F. Combest, St. Louis, Mo., assignor to ACF Industries, Incorporated, New York, N.Y., a corporation of New Jersey Application March 31, 1958, Serial No. 725,217

15 Claims. (Cl. 210—223)

This invention relates to filters and more particularly to improvements in fluid filters and a magnetic filtering element.

The filter of this invention is of the type often used in conjunction with an internal combustion engine for filtering fuel. Foreign matter which should be removed from the fuel includes water, grit such as sand, metallic particles, and the like. Such filters are often equipped with a ceramic filtering element which is constructed as fine as possible without unduly retarding the flow of fuel through the filter. Some of the metallic particles to be filtered from the fuel are magnetizable, such as iron and steel, and a portion of these particles are usually sufficiently fine to pass through the ceramic filter element. It is, therefore, desirable that the filter be equipped with a magnetic filtering element for removing any magnetizable particles which may pass through the ceramic filter element. However, in order to remove as much of the small magnetizable material as possible, the entire quantity of fuel should be brought into intimate contact with the magnet. To facilitate proper service of the filter device, the magnet should, in addition to being so located as to be exposed to the greatest possible volume of fuel, also be readily accessible and easily removable to assure timely replacement in the field. If the magnet is installed in an obscure location in the filter device, or if it is difficult to remove, it is likely that it will be retained in service until it is so loaded with magnetizable material as to become ineffective.

It is, therefore, an object of this invention to provide an improved filtering device.

Another object of this invention is to provide an improved filtering assembly which may be easily serviced.

Still another object of this invention is to provide a filtering device having an improved magnetic filtering unit.

A further object of this invention is to provide an improved magnetic filtering unit.

Additional objects and advantages of this invention will become apparent from the following description and drawings, in which.

The filtering device of this invention includes a filtering element which may be of ceramic material, or the like, and a magnetic filtering unit located in a passageway in such a manner that the entire quantity of filterable material, such as fuel, must flow between the poles of the magnet. In the completed assembly of the filtering device, the magnetic filtering unit may be positively retained in the passageway by the ceramic filtering element or by being anchored to the walls of the passageway.

Figure 1:
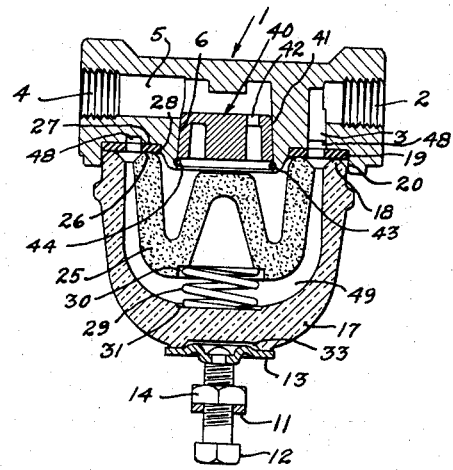
Fig. 1 is a sectional elevation view of an embodiment of the improved filtering device.

Referring to the drawings, Fig. 1 illustrates an embodiment of the filter including a filter body 1 having an inlet 2 connecting with an inlet passage 3, an outlet 4 on the end of passage 5 connecting with a frusto-conical socket 6. A U-shaped strap 11 is attached to opposite sides of the filter body 1 in any conventional manner (not shown). A bolt 12 passes through an aperture in the bite of the U-shaped strap 11. A washer 13 is rotatably secured to the top end of the bolt 12. The bolt 12 is provided with a nut 14 on the bite of strap 11 for tightening the washer 13 against a fuel bowl 17. The fuel bowl may assume any appropriate shape, as cylindrical, and may be formed of glass, metal, plastic, or any other suitable material.

The top end of the fuel bowl 17 is provided with a beveled sealing edge or lip 18. The sealing lip 18 engages a resilient sealing washer 19 received in a cut-out portion 20 in the filter body 1. The vertical wall of the cut-out portion 20 is of such diameter as to give lateral support to the top end of the fuel bowl 17. A filtering element 25 of any suitable material, such as ceramics, is received in the fuel bowl 17 and has a beveled top end 26 which engages a resilient sealing washer 27 received in a reduced portion 28 fo the filter body 1. The filter element 25 is pushed tightly against the sealing member 27 by a spring 29 having its top end received in a socket 30 in the filter element 25, and in a socket 31 in the bottom of the fuel bowl 17. By tightening the bolt 12, the washer 13, which engages a socket 33 in the bottom of the fuel bowl 17, tightly clamps the top end of the fuel bowl against the sealing washer 19 and causes the spring 29 to tightly clamp the top end of the filter element 25 against the sealing washer 27. The washers 19 and 27 may be one unit with passages to permit fuel to flow from the inlet passage 3. A magnetic filter element 40, to be more fully described hereinafter, has frusto-conical side walls 41 conforming to the taper of the frusto-conical socket 6 in the filter body 1, and is received in the socket. The magnetic filter element or unit 40 has holes 42 to permit fuel to pass therethrough. The wall 6 of the filter body 1 is provided with a groove 43 which receives a ring-like element for holding the magnetic filter element 40 in the socket 6. As illustrated in Fig. 1, the ring-like element is a split spring washer 44. Alternatively, a solid fibre washer may be utilized. The inlet 3 opens into a groove 48 in the filter body 1, and the resilient sealing washers 19 and 27 are spaced apart and conform, generally, to the width of the groove 27. Fuel enters through the inlet 2, passes through the inlet passage 3, into groove 48, and then into a chamber 49 formed by the outer surface of the filter element 25 and the inner surface of the fuel bowl 17. The fuel is filtered as it passes through the filter element 25, removing the majority of the impurities. The fuel then flows through the magnetic filter element 40, into the conical socket 6, through outlet passage 5, and through the outlet 4.

As illustrated in the drawings, the filter element 25 has a generally W-shaped configuration in transverse cross section. This configuration provides a substantially increased filter area within a short axial length.

The filter element is generally circular, but may assume any other suitable shape.

Before describing additional embodiments of the filter assembly, various embodiments of the magnetic filter element 40 will be described.

Figure 2:
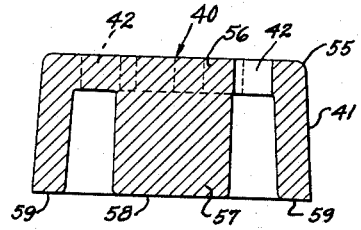
Fig. 2 is a sectional elevation view of an embodiment of a magnetic filtering unit.
Figure 3:
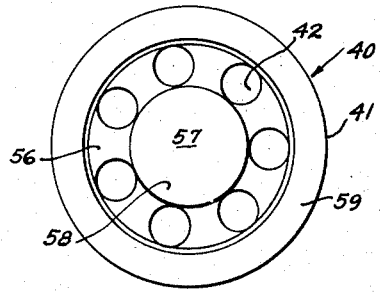
Fig. 3 is a bottom view of a magnetic filtering unit illustrated in Fig. 2.

Figs. 2 and 3 illustrate, to a large scale, the embodiment of the magnetic filter element 40 shown in Fig. 1, which may be formed of a sintered compact, such as barium carbonate and iron oxide, or the like. The transverse cross section illustrated in Fig. 2 may be considered as comprising a generally cup-shaped member 55 having frusto-conical side walls 41 and a base 56. Formed integrally with the base 56 is a center member or post 57. The base 56 is provided with circumferentially spaced holes or fuel passages 42. The magnetic filter element is magnetized in such a manner, as by placing a coil within side walls 41 at around center post 57, to provide the bottom end or free end 58 of the post 57 with a different polarity than the bottom end or free end 59 of the side wall 41. For example, the bottom 58 of the center post 57 may have a positive or north polarity, and the bottom ends or free ends 59 of the side wall 41, a negative or south polarity.

Figure 4:
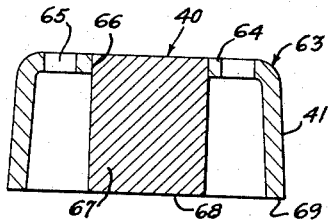
Fig. 4 is a sectional elevation view of another embodiment of a magnetic filtering unit.
Figure 5:
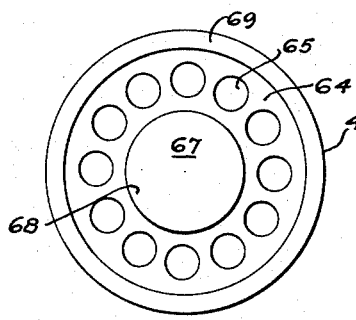
Fig. 5 is a bottom view of the magnetic filtering element illustrated in Fig. 4.

Referring to the embodiment shown in Figs. 4 and 5, the magnetic filter element 40 comprises a mild steel or iron member of cup shape 63, having side walls 41 and a base 64. The base is provided with holes or fuel passages 65. Tightly secured in a socket 66 in the base 64 is a central member or post 67 having a bottom face 68 of an opposite polarity from the bottom edges 69 of the side walls 41, as previously described. The post 67 may be secured in a socket 66 in any appropriate manner, as by a sweat fit, or the like. Alternatively, the post 67 may be a permanent magnet and the cup 63 a magnetic flux conductor.

Figure 6:
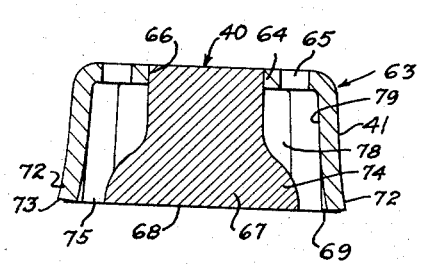
Fig. 6 is a sectional elevation view of another embodiment of a magnetic filtering unit.
Figure 7:
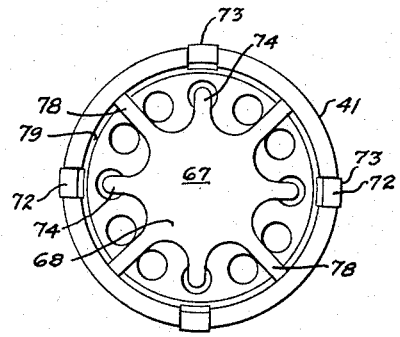
Fig. 7 is a bottom view of the magnetic filtering unit illustrated in Fig. 8.

Figs. 6 and 7 illustrate another embodiment of the magnetic filter element 40 similar to the embodiment previously described with relation to Figs. 4 and 5. This embodiment adds to the embodiment of Figs. 4 and 5 by showing various features which may be incorporated individually or in combination. First, the side walls 41 of the cup-shaped member 63 may be provided with transversely extending tabs 72 for engaging the walls of the fuel pump socket 6 to retain a magnetic filtering element in the socket. If desired, the outer edges 73 of the tabs 72 may be provided with a sharp edge or points for slightly cutting into the walls of the socket 6. The bottom or free ends 68 of the center post 67 is provided with ribs 74 providing a greater surface area for collecting magnetic particles in the fuel which pass through the ceramic filter element 25. The ribs 74 also reduce the air gap 75 between the opposite magnetic poles to aid in retaining a bridge of magnetic particles which may build up between the opposite poles. This embodiment also illustrates ribs or braces 78 formed integrally with the center port 67 and abutting at their outer ends against the inner face 79 of the side walls 41 to strengthen the magnetic filter element and also to provide additional surface area for collecting magnetic particles. The ribs 74 and braces 78 are preferably integral with the center post 67, but they may be separate pieces attached in any appropriate manner, as by welding. The additional features illustrated in Figs. 6 and 7 may also be incorporated into the embodiment illustrated in Figs. 2 and 3, with the exception of the particular form of spring tabs 72, as the compacted and sintered material from which the embodiment of Figs. 2 and 3 is formed does not lend itself to this expedient. The braces 78 would, of course, be integral with the side wall 41.

Figure 8:
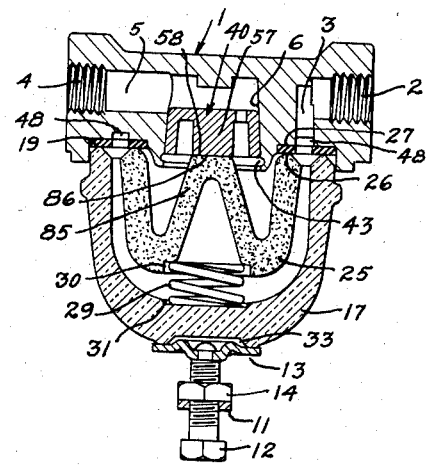
Fig. 8 is a sectional elevation view of another embodiment of a filtering device.

Referring now to Fig. 8, an embodiment of the filter assembly, similar to that described in relationship to Fig. 1, varies from Fig. 1 by substituting for the retaining ring 44 in groove 43, a modification of the ceramic filter element 25. Noting the W-shaped configuration in transverse cross section of the filter element 25, a hollow center post 85 is provided. The top surface 86 of the center post is made of sufficient height to engage the bottom face 58 of the magnetic filter unit center post 57 to retain the magnetic filter element 40 in the socket 6. In applying this method of retaining the magnetic filter element in the socket, the sealing washer 27 must be of sufficient thickness and resiliency that the sealing edge 26 of the ceramic filter element 25 will be in adequate sealing engagement with the washer after positive solid contact has been established between the top face 86 of the ceramic filter element post 85 and the bottom face 58 of the magnetic filter unit post 57. The remaining features of this embodiment are the same as those described in relationship to Fig. 1, and any of the embodiments of the magnetic filter elements may be retained in the socket 6 in this manner.

Figure 9:
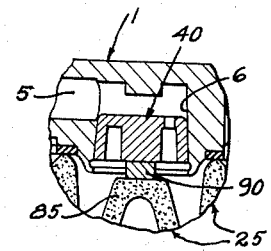
Fig. 9 is a sectional elevation view of another embodiment of a filtering device.

Fig. 9 illustrates another embodiment of the filter assembly in which the magnetic filter element 40 is again retained in the socket 6 by the center post 85 of the ceramic filter element 25, but, in this embodiment, a block 90 is inserted between the top face of the ceramic filter element post 85 and the bottom face of the post 57 of the magnetic filter unit. The block 90 may be of rigid material in which event the sealing ring 57 must be of the same nature as in the embodiment illustrated in Fig. 8, that is, it must be of sufficient thickness and resiliency to provide a positive seal between the ceramic filter element 25 and the filter body 1. Alternatively, the block 90 may be of resilient material, which facilitates adapting the embodiment of Fig. 1 and, more particularly, the ceramic filter element 25 shown in Fig. 1 retains the magnetic filter unit 40 in the socket 6 by merely inserting the pad 90 between the magnetic filter unit 40 and the ceramic filter element 25.

Any of the magnetic filter units 40 illustrated herein may be retained in socket 6 in any of the manners herein described.

Although this invention has been described with reference to certain embodiments, materials, and particular structural relationships, various changes will be apparent to one skilled in the art, and the invention is, therefore, not to be limited to such embodiments, materials, or structural relationships, except as set forth in the appended claims.

I claim:

1. A magnetic element comprising a cup-shaped member having a base and side walls projecting generally transversely from said base, said side walls having a free end remote from said base, and a member projecting from said base between said side walls, said member having a free end remote from said base, said free ends having different polarities.

2. A magnetic filtering element comprising a cup-shaped member having a base and side walls projecting generally transversely from said base, said side walls having a free end remote from said base, a member projecting from said base between said side walls, said member having a free end remote from said base, said free ends having different polarities, and openings in said base between said member and said side wall.

3. A magnetic filtering element comprising a wall means having a free end, a post within said wall means, said post having a free end spaced from said wall means, a connecting portion between said post and said wall means away from said free ends, and an opening in said connecting portion.

4. The magnetic filter element of claim 3 wherein said post, wall means and connecting portion is a substantially homogeneous mass.

5. The magnetic filter element of claim 3 wherein said post and said wall means are different pieces joined together.

6. The magnetic filter element of claim 3 wherein the side walls of said cup-shaped element are provided with prongs extending outwardly from said magnet.

7. The magnetic filter element of claim 3 wherein said post has ribs extending toward said wall means.

8. The magnetic filter element of claim 7 wherein said ribs extend between said post and said wall means.

9. A magnetic element comprising a magnetic flux conducting member having a base and a side wall means with a free end away from said base, a magnet having one pole secured to said base, and an opposite pole at a free end between said side wall means, whereby said free end of said side wall means has a polarity opposite that of the free end of said magnet.

10. A fuel filtering device comprising a top portion having inlet and outlet passageways therein for receiving and discharging fuel, a removable bottom portion engaging said top portion, a replaceable porous element received within said bottom portion and intermediately disposed between said inlet and said outlet for filtering the fuel passing therethrough, a biasing member disposed between said bottom portion and said porous element for maintaining said porous element in substantially sealed engagement with said top portion, and a cup shaped magnetically polarized unit received within and substantially closing said outlet passageway for removing magnetizable material from said fuel.

11. A fuel filtering device comprising a top portion having inlet and outlet passageways therein for receiving and discharging fuel, a removable bottom portion engaging said top portion, a replaceable porous element received within said bottom portion and intermediately disposed between said inlet and said outlet for filtering the fuel passing therethrough, a biasing member disposed between said bottom portion and said porous element for maintaining said porous element in substantially sealed engagement with said top portion, a cup shaped magnetically polarized unit received within and substantially closing said outlet passageway for removing magnetizable material from said fuel, and a removable member fitted within said top portion for locking said magnetically polarized unit in place.

12. A fuel filtering device comprising a top portion having inlet and outlet passageways therein for receiving and discharging fuel, a removable bottom portion engaging said top portion, a replaceable porous element received within said bottom portion and intermediately disposed between said inlet and said outlet for filtering the fuel passing therethrough, a biasing member disposed between said bottom portion and said porous element for maintaining said porous element in substantially sealed engagement with said top portion, and a cup shaped magnetically polarized unit received within and substantially closing said outlet passageway for removing magnetizable material from said fuel, said magnetically polarized unit having a base with a plurality of apertures therein, a magnetized core, and frusto-conical side walls.

13. A fuel filtering device comprising a top portion having inlet and outlet passageways therein for receiving and discharging fuel, a removable bottom portion engaging said top portion, a replaceable porous element received within said bottom portion and intermediately disposed between said inlet and said outlet for filtering the fuel passing therethrough, a biasing member disposed between said bottom portion and said porous element for maintaining said porous element in substantially sealed engagement with said top portion, a cup shaped magnetically polarized unit received within and substantially closing said outlet passageway for removing magnetizable material from said fuel, said magnetically polarized unit having a base with a plurality of apertures therein, a magnetized core, and frusto-conical side walls "and a removable locking member fitted within said top portion immediately adjacent said magnetically polarized unit for maintaining said magnetically polarized unit in place."

14. A fuel filtering device comprising a top portion having threaded inlet and outlet passageways therein for receiving and discharging fuel, a removable cup shaped bottom portion engaging said top portion, fastening means for securing said bottom portion to said top portion, a resilient sealing member fitted within said top portion for engagement with said bottom portion, a replaceable W-shaped porous element received within said bottom portion and intermediately disposed between said inlet and said outlet for filtering the fuel passing therethrough, a compression spring disposed between said bottom portion and said porous element for maintaining said porous element in substantially sealed engagement with said top portion, a cup shaped magnetically polarized unit having frusto-conical sides and a plurality of apertures in the base thereof received within and substantially closing said outlet passageway for removing magnetizable material from said fuel, and a removable locking member fitted within said top portion for engagement with said magnetically polarized unit.

15. In a fuel filtering device including a body having inlet and outlet openings, said body being formed with a cavity opening into said outlet opening, a filtering unit clamped to said body in the path of fluid passing from said inlet to said outlet, a magnetic device having an outer surface adapted to fit in said cavity, said magnetic device being formed with a recess, and ports formed in the base of said recess in communication with said outlet.

References Cited in the file of this patent

UNITED STATES PATENTS

| | | |
|---|---|---|
| 2,680,519 | Rundquist et al. | June 8, 1954 |
| 2,795,333 | Kennedy | June 11, 1957 |